(12) United States Patent
Fujimura et al.

(10) Patent No.: US 10,840,598 B2
(45) Date of Patent: Nov. 17, 2020

(54) COMMUNICATION DEVICE

(71) Applicant: Murata Manufacturing Co., Ltd., Nagaokakyo (JP)

(72) Inventors: Yu Fujimura, Nagaokakyo (JP); Shingo Ito, Nagaokakyo (JP); Masaaki Kanao, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 0 days.

(21) Appl. No.: 16/536,632

(22) Filed: Aug. 9, 2019

(65) Prior Publication Data
US 2019/0363442 A1 Nov. 28, 2019

Related U.S. Application Data

(63) Continuation of application No. PCT/JP2018/008317, filed on Mar. 5, 2018.

(30) Foreign Application Priority Data

Mar. 13, 2017 (JP) .................. 2017-047152

(51) Int. Cl.
*H01Q 9/04* (2006.01)
*H01Q 1/38* (2006.01)
(Continued)

(52) U.S. Cl.
CPC ......... *H01Q 9/0414* (2013.01); *H01Q 1/2291* (2013.01); *H01Q 1/38* (2013.01); *H01Q 17/001* (2013.01)

(58) Field of Classification Search
CPC .... G04R 60/10; H01Q 1/2291; H01Q 9/0414; H01Q 1/38; H01Q 17/001; H01Q 1/521; H01Q 21/28; G04G 21/04; H04B 1/3827
See application file for complete search history.

(56) References Cited

U.S. PATENT DOCUMENTS 9,509,813 B2 * 11/2016 Chung ................ H04M 1/0262
9,861,080 B1 * 1/2018 Hathway .............. A01K 11/008
(Continued)

FOREIGN PATENT DOCUMENTS

JP 2008-020324 A 1/2008
JP 2013-070365 A 4/2013
(Continued)

OTHER PUBLICATIONS

Official Communication issued in International Patent Application No. PCT/JP2018/008317 dated Apr. 10, 2018.

*Primary Examiner* — Graham P Smith
*Assistant Examiner* — Jae K Kim
(74) *Attorney, Agent, or Firm* — Keating & Bennett, LLP

(57) ABSTRACT

A communication device includes a first substrate including antennas including a first antenna and a second antenna, and a battery including a principal surface and being used as a power source of a circuit connected to the antennas. The battery, when viewed in a direction perpendicular or substantially perpendicular to the principal surface of the battery, is disposed between the first antenna and the second antenna, and a portion or all of the first antenna and the second antenna overlap with the battery, when viewed in a direction in parallel or substantially parallel to the principal surface of the battery.

18 Claims, 10 Drawing Sheets

(51) Int. Cl.
*H01Q 1/22* (2006.01)
*H01Q 17/00* (2006.01)

(56) References Cited

U.S. PATENT DOCUMENTS

| | | | |
|---|---|---|---|
| 2005/0012669 A1* | 1/2005 | Ide | H01Q 9/42 343/702 |
| 2008/0042850 A1* | 2/2008 | De Witte | G06K 19/0724 340/572.7 |
| 2012/0230377 A1* | 9/2012 | Jenwatanavet | H01Q 1/48 375/222 |
| 2013/0069836 A1 | 3/2013 | Bungo | |
| 2013/0188803 A1* | 7/2013 | Shaanan | H04R 1/10 381/74 |
| 2013/0322217 A1* | 12/2013 | Aizawa | G04B 47/00 368/14 |
| 2014/0091974 A1* | 4/2014 | Desclos | H01P 11/001 343/745 |
| 2014/0206417 A1* | 7/2014 | Sung | H01Q 9/42 455/566 |
| 2015/0035709 A1* | 2/2015 | Lim | H02J 50/005 343/720 |
| 2015/0237425 A1* | 8/2015 | Ou | G06F 1/1656 381/334 |
| 2015/0244062 A1* | 8/2015 | Chou | H04B 5/0031 455/41.1 |
| 2017/0026762 A1* | 1/2017 | Ruaro | H01Q 9/27 |
| 2017/0338864 A1 | 11/2017 | Rolsted et al. | |

FOREIGN PATENT DOCUMENTS

| | | |
|---|---|---|
| JP | 2014-150723 A | 8/2014 |
| WO | 2016/110592 A1 | 7/2016 |

* cited by examiner

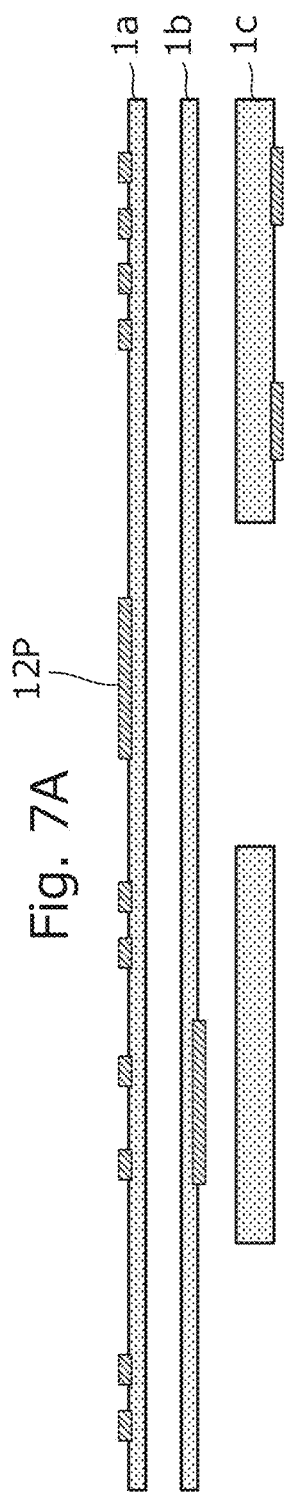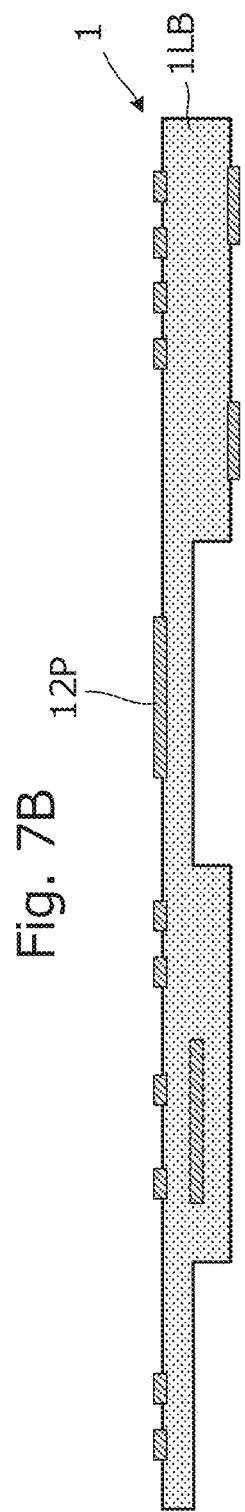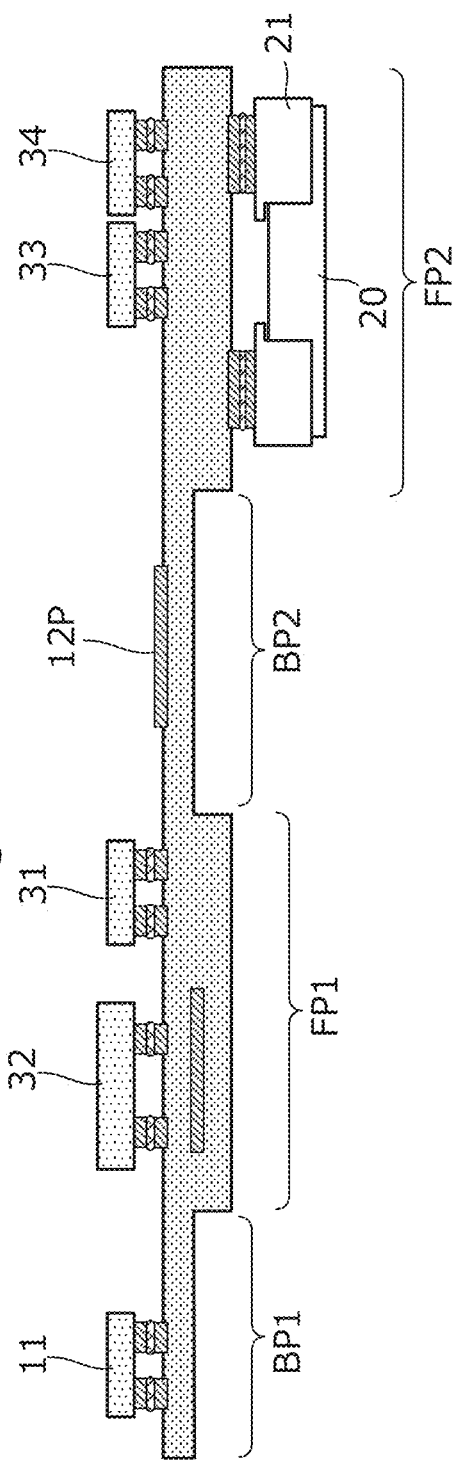

COMMUNICATION DEVICE

CROSS REFERENCE TO RELATED APPLICATIONS

This application claims the benefit of priority to Japanese Patent Application No. 2017-047152 filed on Mar. 13, 2017 and is a Continuation Application of PCT Application No. PCT/JP2018/008317 filed on Mar. 5, 2018. The entire contents of each application are hereby incorporated herein by reference.

BACKGROUND OF THE INVENTION

1. Field of the Invention

The present invention relates to a communication device that receives a predetermined radio wave and performs wireless communication.

2. Description of the Related Art

Conventionally, in a small communication device with a communication function, such as a wrist watch or a portable electronic device, a circuit board including an electronic circuit, an antenna, and a battery as a power source have been embedded in a housing.

For example, Japanese Unexamined Patent Application Publication No. 2008-020324 discloses a wrist watch including an antenna for receiving a standard time radio wave, a circuit board including a processing circuit that performs various types of processing based on received standard time radio wave, and a battery that are stored in a watch case.

However, such a small communication device as disclosed in Japanese Unexamined Patent Application Publication No. 2008-020324 needs to store an antenna in the limited space in a housing, so that mutual interference between an antenna and a circuit (a peripheral circuit) disposed around this antenna may cause a problem in many cases. If an electromagnetically large space is provided around the antenna in order to avoid a problem of such interference, a device is not able to be miniaturized. In particular, in a case in which a plurality of antennas are disposed, such a problem becomes significant. Furthermore, in the case in which a plurality of antennas are disposed, interference between antennas also causes a problem.

SUMMARY OF THE INVENTION

Preferred embodiments of the present invention provide communication devices in each of which mutual interference between an antenna and a peripheral circuit and interference between antennas are significantly reduced or prevented without obstructing miniaturization of the device.

A communication device according to a preferred embodiment of the present invention includes a first substrate including a plurality of antennas including a first antenna and a second antenna, and a battery including a principal surface and being used as a power source of a circuit connected to the plurality of antennas.

The battery, when viewed in a direction perpendicular or substantially perpendicular to the principal surface of the battery, is disposed between the first antenna and the second antenna, and a portion or all of the first antenna and the second antenna overlap with the battery, when viewed in a direction in parallel or substantially parallel to the principal surface of the battery.

With the above configuration, the battery provides electromagnetic shielding between the first antenna and the second antenna, so that interference between the first antenna and the second antenna is significantly reduced or prevented without arranging a special dedicated member.

In addition, a plurality of antennas are provided on one substrate, so that a structure in which the plurality of antennas are disposed in the device and electrically connected to the circuit is simplified, which enables space saving.

Although the principal surface of the battery, that is, a surface having a large area is disposed in parallel to a substrate including a plurality of circuit patterns or a display panel in many cases, in such a structure, the first antenna and the second antenna are disposed at positions to interpose the battery, that is, on both lateral sides of the battery. Therefore, the first antenna and the second antenna are spaced away from the circuit patterns or the display panel, so that mutual interference is easily reduced. As a result, a small communication device is easily provided.

The first substrate, for example, includes a plurality of flat portions including a first flat portion and a second flat portion, and a bent portion that connects flat portions that are adjacent to each other, and the first antenna is disposed in the first flat portion, and the second antenna is disposed in the second flat portion.

In the above configuration, the first substrate is able to be curved or bent at the bent portion, so that the first antenna and the second antenna are easily disposed at positions to interpose the battery between the first antenna and the second antenna. In addition, the first antenna and the second antenna are easily disposed at positions spaced away from the circuit patterns provided on or in the first substrate. It is to be noted that the "positions to interpose the battery" in the present preferred embodiment are not limited to positions in which the first antenna and the second antenna interpose the battery in contact with the first antenna and the second antenna but include positions in which the first antenna and the second antenna are electromagnetically and spatially away from the battery.

The first substrate may be a multilayer body of insulator layers, for example, and each of the first flat portion and the second flat portion may preferably include a greater number of insulator layers than the bent portion. In this configuration, a portion between the first flat portion and the second flat portion is easily bent, and the first antenna and the second antenna are able to be easily provided in the flat portion of the first substrate.

The first substrate may include a flat portion and a bent portion that is continuous from the flat portion, for example, and at least one of the first antenna and the second antenna may preferably be disposed in the bent portion. In this configuration, at least one of the first antenna and the second antenna is spaced away from a surface of the flat portion. As a result, the first antenna and the second antenna are easily disposed at positions to interpose the battery between the first antenna and the second antenna. In addition, the first antenna and the second antenna are easily disposed at positions spaced away from the circuit patterns provided on or in the first substrate.

The first substrate may be a multilayer body of insulator layers, for example, and the flat portion may preferably include a greater number of insulator layers than the bent portion. With this configuration, the bent portion is easily bent to the flat portion, and the flatness of the flat portion is able to be easily maintained.

The first substrate may preferably include the battery or a battery holder that holds the battery, for example. With this configuration, a structure to place the battery in the device and to connect the battery to the circuit is simplified, which enables space saving.

The communication device may include a second substrate that is different from the first substrate, and the second substrate may include a battery or a battery holder that holds the battery. With this configuration, the flexibility of the arrangement of the battery, and the first antenna and the second antenna is increased.

A surface of the first substrate on which the first antenna and the second antenna are disposed may preferably face a surface of the second substrate on which the battery or the battery holder is mounted. With this configuration, a distance between the first substrate and the second substrate is able to be reduced, and the communication device is able to be made thinner.

A use frequency band of the first antenna, for example, may be substantially an integral multiple of a use frequency band of the second antenna. As a result, although interference between the first antenna and the circuit to which the first antenna is connected, and the second antenna and the circuit to which the second antenna is connected becomes significant, the interference is effectively reduced.

The first antenna and the second antenna may be antennas for wireless LAN of a same or substantially a same frequency band, for example. As a result, although interference between the first antenna and the circuit to which the first antenna is connected, and the second antenna and the circuit to which the second antenna is connected becomes significant, the interference is effectively reduced.

Either or both of the first antenna and the second antenna may include a directivity that directs a direction away from the battery, for example. As a result, either or both of the first antenna and the second antenna may not be easily affected by unnecessary shielding or unnecessary reflection due to the battery. In addition, the interference between the first antenna and the second antenna is able to be further significantly reduced or prevented.

According to preferred embodiments of the present invention, mutual interference between an antenna and a peripheral circuit and interference between antennas are able to be significantly reduced or prevented, and a small communication device is able to be provided.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 7A is a cross-sectional view of components of a first substrate 1 before lamination, and FIG. 7B is a cross-sectional view of the first substrate 1 after lamination. FIG. 7C shows a state in which a first antenna 11 and other electronic components 31, 32, 33, and 34 are surface-mounted on the first substrate 1.

DETAILED DESCRIPTION OF THE PREFERRED EMBODIMENTS

Figure 1A:
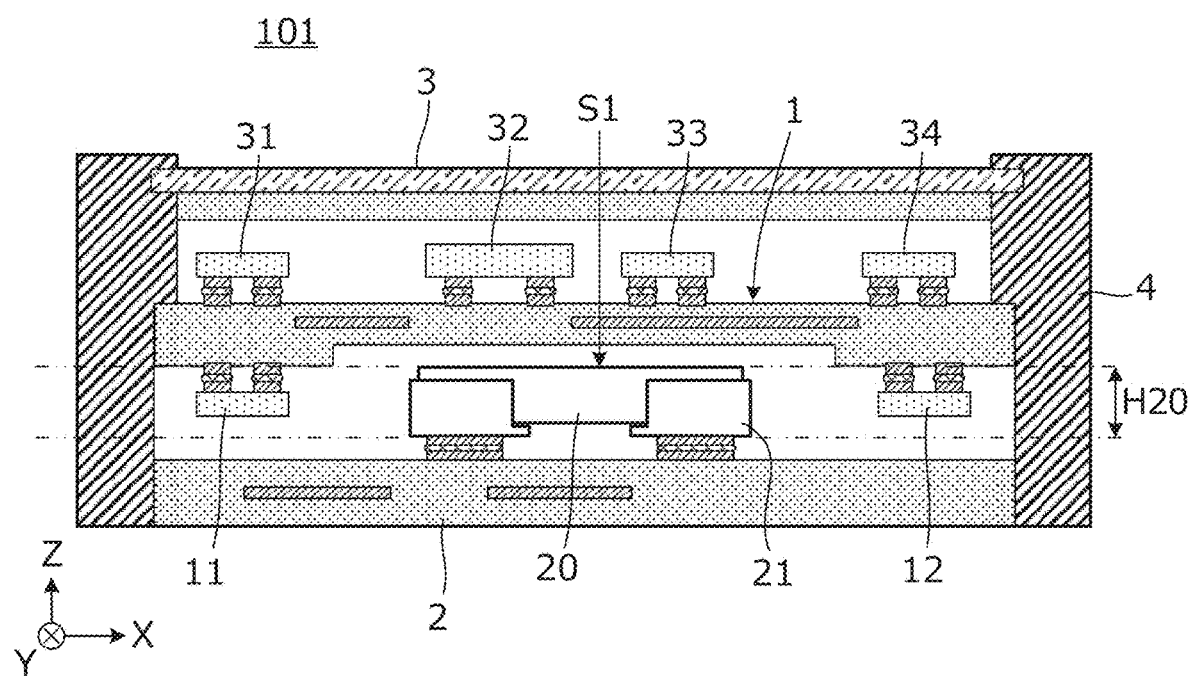
FIG. 1A is a cross-sectional view of an X-Z plane of a communication device 101 according to a first preferred embodiment of the present invention.

Hereinafter, a plurality of preferred embodiments of the present invention will be described with reference to the attached drawings and several specific examples. In the drawings, components and elements assigned with the same reference numerals or symbols will represent identical components and elements. While preferred embodiments of the present invention are divided and described for the sake of convenience in consideration of ease of description or understanding of main points, constituent elements described in different preferred embodiments are able to be partially replaced or combined with each other. In second and subsequent preferred embodiments, a description of matters common to the first preferred embodiment will be omitted and only different points are described. In particular, the same functions and effects by the same configuration will not be described one by one for each preferred embodiment.

First Preferred Embodiment

Figure 1B:
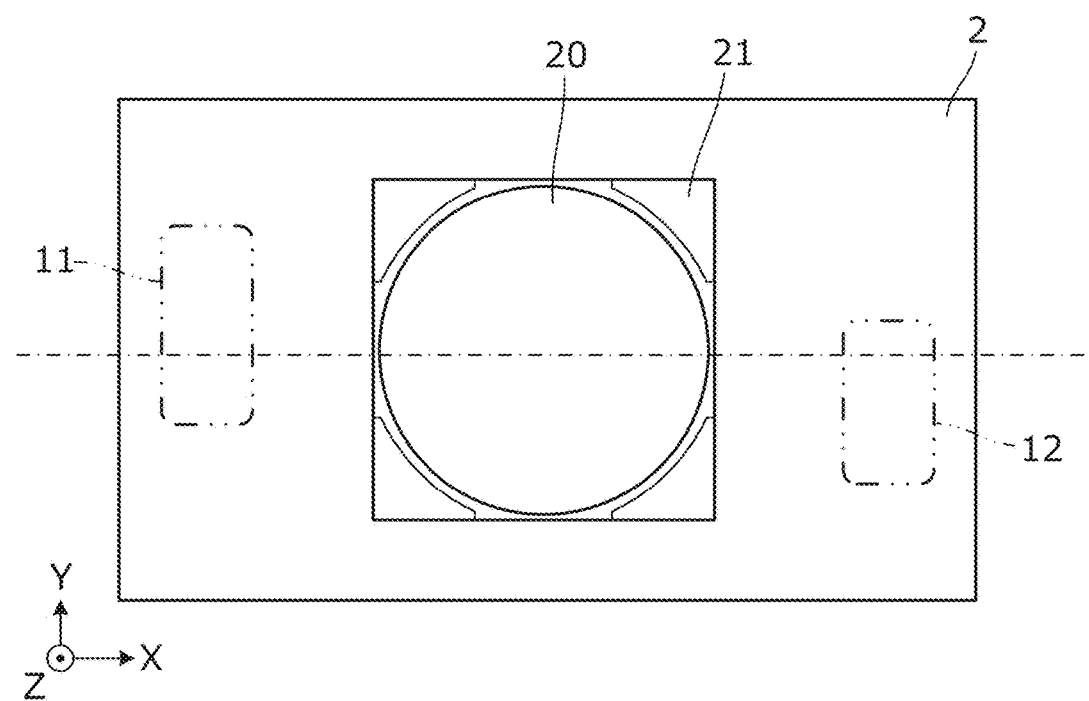
FIG. 1B shows a positional relationship in a plane direction of a battery and two antennas 11 and 12.

FIG. 1A is a cross-sectional view of an X-Z plane of a communication device 101 according to a first preferred embodiment of the present invention, and FIG. 1B shows a positional relationship in a plane direction of a battery and two antennas 11 and 12.

The communication device 101 includes a first substrate 1, a second substrate 2, a display panel 3, and a frame 4 that stores such components. The first antenna 11, the second antenna 12, and a plurality of other electronic components 31, 32, 33, and 34 are mounted on the first substrate 1. The battery holder 21 is mounted on the second substrate 2, and the battery 20 is attached to the battery holder 21. This battery 20 is used as a power source of a circuit connected to the first antenna 11 and the second antenna 12.

The first antenna 11 and the second antenna 12 are mounted on the bottom surface of the first substrate 1, and the battery holder 21 is mounted on the top surface of the second substrate 2. In other words, a surface of the first substrate 1 on which the first antenna 11 and the second antenna 12 are disposed faces a surface of the second substrate 2 on which the battery or the battery holder is mounted.

FIG. 1B shows a position (in-plane position) in the plane direction of the battery 20 on the second substrate 2, and also shows positions of the first antenna 11 and the second antenna 12. As shown in FIG. 1A, the battery 20 includes a principal surface S1. As shown in FIG. 1B, the battery 20 is disposed between the first antenna and the second antenna, when viewed in a direction perpendicular or substantially perpendicular to the principal surface S1 of the battery 20.

Figure 2:
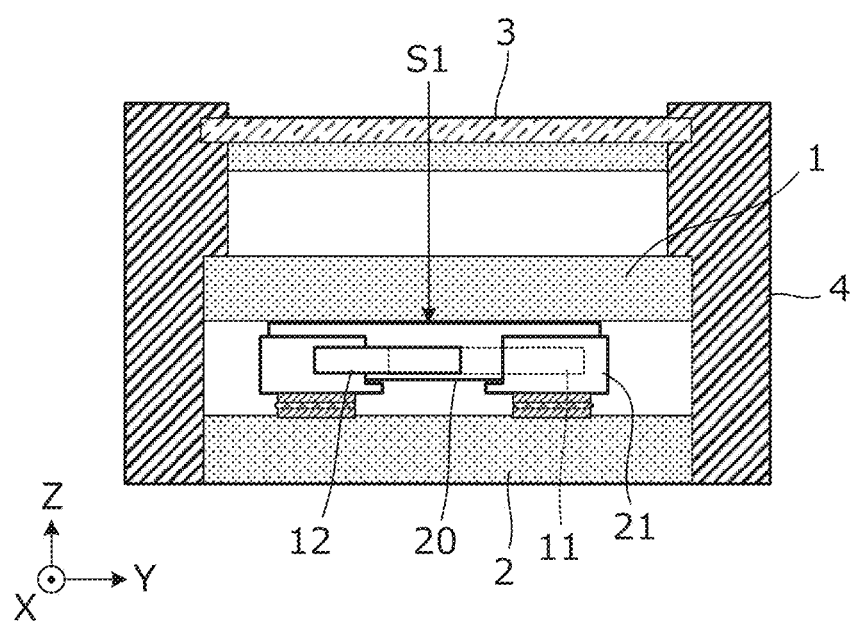
FIG. 2 is a cross-sectional view of a Y-Z plane of the communication device 101, and shows a positional relationship in a height direction of the battery 20, the first antenna 11, and the second antenna 12.

FIG. 2 is a cross-sectional view of a Y-Z plane of the communication device 101, and shows a positional relationship of the battery 20, the first antenna 11, and the second antenna 12. In FIG. 1A, a height H20 is the height of the battery 20, when viewed in a direction in parallel or substantially parallel to the principal surface S1 of the battery 20. As shown in FIG. 2, the first antenna 11 and the second antenna 12 overlap with the battery 20, when viewed in the direction in parallel or substantially parallel to the principal surface S1 of the battery 20.

Of various use frequency bands of the first antenna 11 and the second antenna 12, for example, the first antenna 11 is an antenna to receive a standard time radio wave, and the second antenna 12 is an antenna to perform near field communication by Bluetooth (registered trademark) or the like. In addition, for example, the first antenna 11 and the second antenna 12 are antennas for wireless LAN of a same or substantially a same frequency band. The plurality of antennas may be used to communicate, for example, by a MIMO (Multi-Input Multi-Output) method. Furthermore, for example, either or both of the first antenna 11 and the second antenna 12 may be used for mobile phone communication. In addition, one of the first antenna 11 and the second antenna 12 may be a GPS antenna.

In any case, when the use frequency band of the first antenna 11 is substantially an integral multiple of the use frequency band of the second antenna, the first antenna 11 and the circuit connected to the first antenna 11 easily interfere with the second antenna 12 and the circuit connected to the second antenna 12.

The battery 20 is substantially entirely covered with a metal plate, so that, with the above configuration, the battery 20 provides electromagnetic shielding between the first antenna 11 and the second antennas 12. Therefore, the interference between the first antenna 11 and the second antenna 12 is significantly reduced or prevented without arranging a special dedicated member.

In addition, with this configuration, the first antenna 11 and the second antennas 12 are provided on one substrate 1, so that a structure in which the first antenna 11 and the second antennas 12 are disposed in the device and electrically connected to the circuit is simplified, which enables space saving.

In addition, the principal surface S1 of the battery 20, that is, a surface having a large area is disposed in parallel to the first substrate 1 including a plurality of circuit patterns, the second substrate 2 including a plurality of circuit patterns, and the display panel 3, and the first antenna 11 and the second antenna 12 are disposed at positions to interpose the battery 20 between the first antenna 11 and the second antenna 12, that is, in a space on both lateral sides of the battery 20, which enables space saving as a whole. In addition, the first antenna 11 and the second antenna 12 are spaced away from the circuit patterns provided on or in the first substrate 1 or the second substrate 2, the display panel 3, a flexible cable connected to the display panel 3, or similar components, so that mutual interference is easily reduced. In this respect, a small communication device is easily provided.

It is to be noted that the "positions to interpose the battery" in the present preferred embodiment are not limited to positions in which the first antenna and the second antenna interpose the battery in contact with the first antenna and the second antenna but include positions in which the first antenna and the second antenna are electromagnetically and spatially away from the battery.

In addition, preferred embodiments of the present invention are not limited to a configuration in which the whole portion that functions as an antenna of each of the first antenna 11 and the second antenna 12 overlaps with the battery. Furthermore, three or more antennas may be provided, and at least two antennas (the first antenna and the second antenna) may be disposed so as to interpose the battery between the antennas.

In the first preferred embodiment, since the first substrate 1 on which the first antenna 11 and the second antenna 12 are mounted, and the second substrate on which the battery is provided are separated, the flexibility of the arrangement of the battery 20, and the first antenna 11 and the second antenna 12 is high.

Subsequently, a configuration of the first substrate 1 will be described below with reference to FIGS. 3A, 3B, and 3C.

Figure 3A:
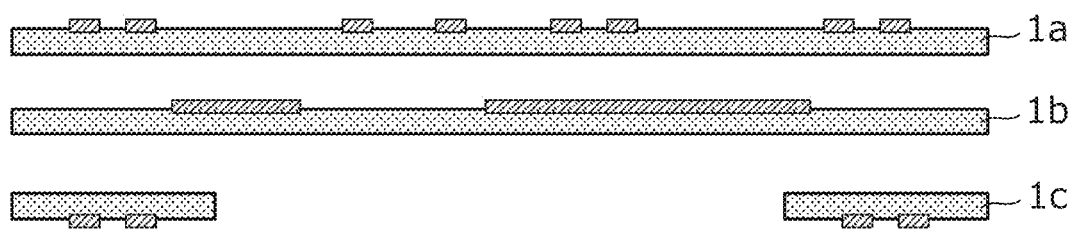
FIG. 3A is a cross-sectional view of components of a first substrate 1 before lamination.
Figure 3B:
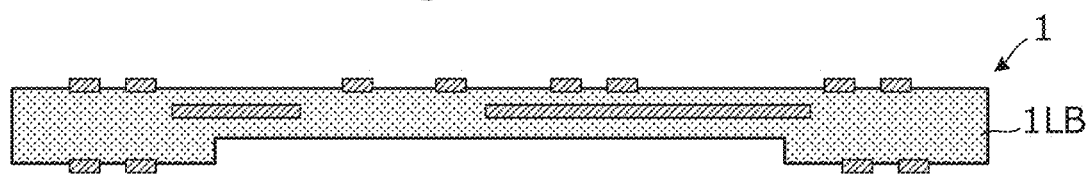
FIG. 3B is a cross-sectional view of the first substrate 1 after lamination.

FIG. 3A is a cross-sectional view of components of the first substrate 1 before lamination, and FIG. 3B is a cross-sectional view of the first substrate 1 after lamination. The first substrate 1 is a multilayer body of insulator layers 1a, 1b, and 1c, and a conductor pattern is provided at a predetermined place. The insulator layers 1a, 1b, and 1c are, for example, sheets of thermoplastic resin such as liquid crystal polymer (LCP), and the conductor pattern is provided by patterning a metal foil such as a copper foil attached to the insulator layers, by photolithography. The insulator layers 1a, 1b, and 1c are stacked and thermally pressed to define a multilayer body of insulator layers 1LB shown in FIG. 3B.

While the multilayer body 1LB is defined by bonding and integrating the surfaces of the sheets of thermoplastic resin, an adhesive layer may be provided between respective sheets.

Figure 3C:
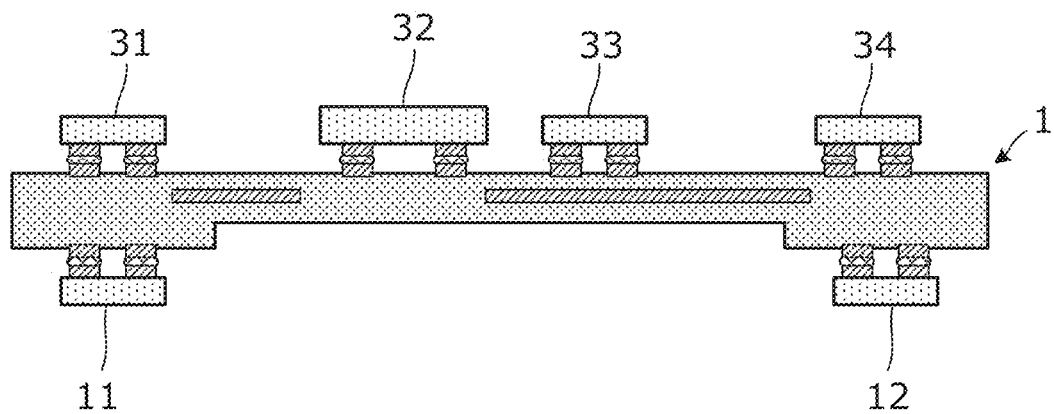
FIG. 3C shows a state in which a first antenna 11, a second antenna 12, and other electronic components 31, 32, 33, and 34 are surface-mounted on the first substrate 1.

Although not shown in FIGS. 3A, 3B, and 3C, as necessary, the multilayer body 1LB may include an interlayer connection conductor (a via hole conductor). The interlayer connection conductor is provided by filling a hole for a via hole conductor with a metal material including tin as a main component, the hole being provided in the sheets of thermoplastic resin.

FIG. 3C shows a state in which the first antenna 11, the second antenna 12, and other electronic components 31, 32, 33, and 34 are surface-mounted on the first substrate 1. The first substrate 1 in this state is incorporated into the frame 4 shown in FIGS. 1A and 1B.

Second Preferred Embodiment

A second preferred embodiment of the present invention shows an example of a communication device with a structure of a substrate on which an antenna is mounted, the structure being different from the structure shown in the first preferred embodiment.

Figure 4:
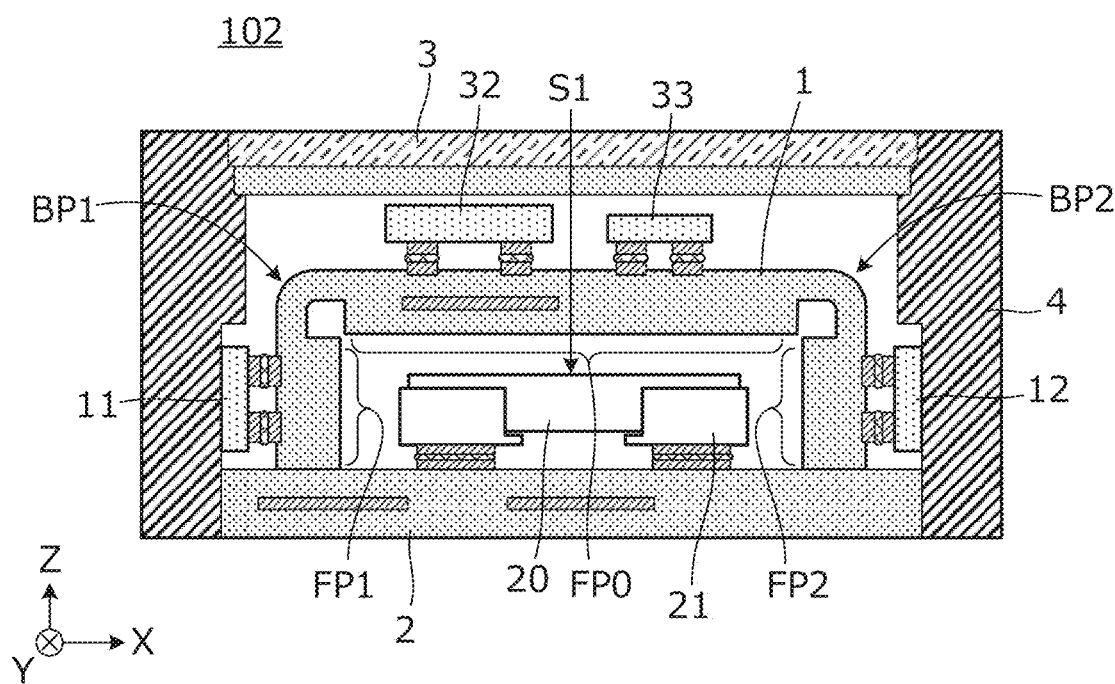
FIG. 4 is a cross-sectional view of a communication device 102 according to a second preferred embodiment of the present invention.

FIG. 4 is a cross-sectional view of a communication device 102 according to the second preferred embodiment of the present invention. The communication device 102 is mainly different from the communication device 101 shown in FIGS. 1A and 1B in the shape of the first substrate 1 and the mounting structure of the first antenna 11 and the second antenna 12.

The communication device 102 includes a first substrate 1, a second substrate 2, a display panel 3, and a frame 4 that stores such components. A first antenna 11, a second antenna 12, and a plurality of other electronic components 32 and 33 are mounted on the first substrate 1. A battery holder 21 is mounted on the second substrate 2, and a battery 20 is attached to the battery holder 21.

The first substrate 1 includes a plurality of flat portions including a first flat portion FP1 and a second flat portion FP2, and bent portions BP 1 and BP2 that connect flat portions that are adjacent to each other. The first antenna 11 is disposed in the first flat portion FP1, and the second antenna 12 is disposed in the second flat portion FP2. The first substrate 1 is bent at each of the bent portions BP1 and BP2. The battery 20, when viewed in the direction perpendicular or substantially perpendicular to the principal surface S1 of the battery 20, is disposed between the first antenna 11 and the second antenna 12. In addition, the first antenna 11 and the second antenna 12 overlap with the battery 20, when viewed in the direction in parallel or substantially parallel to the principal surface S1 of the battery 20.

With the above configuration, the battery 20 provides electromagnetic shielding between the first antenna 11 and the second antennas 12. Therefore, the interference between the first antenna 11 and the second antenna 12 is significantly reduced or prevented without arranging a special dedicated member.

In addition, the principal surface S1 of the battery 20, that is, a surface having a large area is disposed in parallel to the first substrate 1 including a plurality of circuit patterns, the second substrate 2 including a plurality of circuit patterns, and the display panel 3, and the first antenna 11 and the second antenna 12 are disposed at positions to interpose the battery 20 between the first antenna 11 and the second antenna 12, that is, in a space on both lateral sides of the battery 20, which enables space saving as a whole. In addition, the first antenna 11 and the second antenna 12 are spaced away from the circuit patterns provided on or in the first substrate 1 or the second substrate 2, or the display panel 3, and mutual interference is significantly reduced or prevented.

Figure 5A:
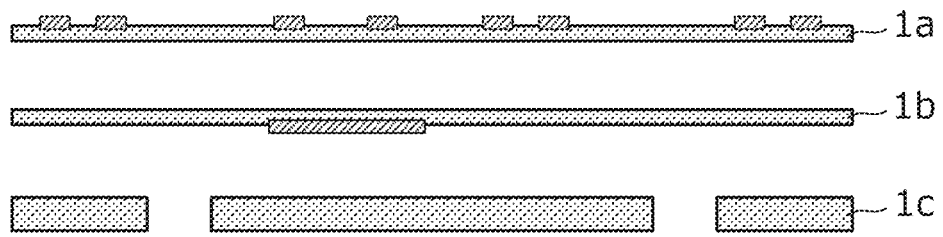
FIG. 5A is a cross-sectional view of components of a first substrate 1 before lamination.
Figure 5B:
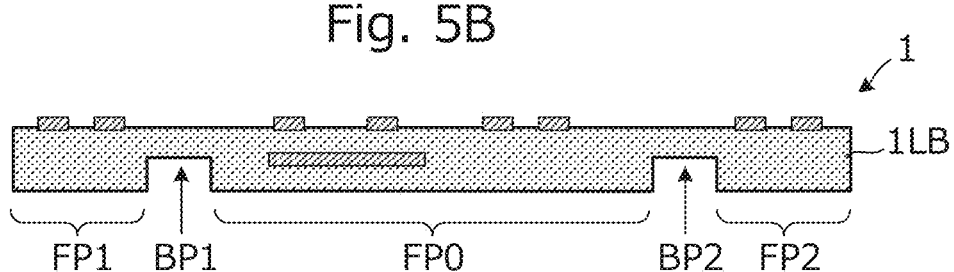
FIG. 5B is a cross-sectional view of the first substrate 1 after lamination.

FIG. 5A is a cross-sectional view of components of the first substrate 1 before lamination, and FIG. 5B is a cross-sectional view of the first substrate 1 after lamination. The first substrate 1 is a multilayer body of insulator layers 1a, 1b, and 1c, and a conductor pattern is provided at a predetermined place. The insulator layers 1a, 1b, and 1c are, for example, sheets of thermoplastic resin such as liquid crystal polymer (LCP), and the conductor pattern is provided by patterning a copper foil attached to the insulator layers. The insulator layers 1a, 1b, and 1c are stacked and thermally pressed to define a multilayer body 1LB shown in FIG. 5B.

Figure 5C:
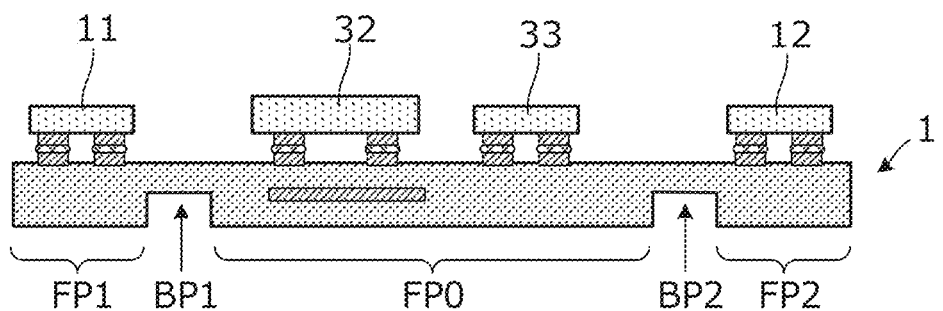
FIG. 5C shows a state in which a first antenna 11, a second antenna 12, and other electronic components 32 and 33 are surface-mounted on the first substrate 1.

FIG. 5C shows a state in which the first antenna 11, the second antenna 12, and other electronic components 32 and 33 are surface-mounted on the first substrate 1. The first antenna 11 is mounted to the first flat portion FP1, and the second antenna 12 is mounted to the second flat portion FP2.

In addition, the other electronic components 32 and 33 are mounted to a flat portion FP0. According to this structure, the smoothness of the surface on which an antenna and other components are mounted is not significantly impaired.

Figure 5D:
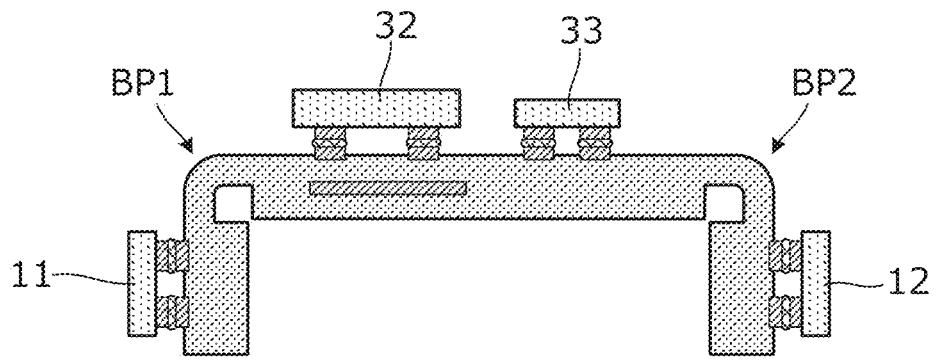
FIG. 5D shows a state in which the first substrate 1 is bent about 90 degrees at each of bent portions BP1 and BP2 from the state shown in FIG. 5C.

FIG. 5D shows a state in which the first substrate 1 is bent about 90 degrees at each of the bent portions BP1 and BP2 from the state shown in FIG. 5C. The first substrate 1 in this state is incorporated into the frame 4 shown in FIG. 4.

The number of layers of the insulator layers of the flat portions FP0, FP1, and FP2 is greater than the number of layers of the bent portions BP1 and BP2. In this configuration, a portion between the first flat portion FP1 and the second flat portion FP2 is easily bent, and the first antenna 11 and the second antenna 12 are able to be easily provided.

In addition, the first antenna 11 and the second antenna 12 are thus easily disposed at positions to interpose the battery 20 between the first antenna 11 and the second antenna 12. In addition, the first antenna 11 and the second antenna 12 are easily disposed at positions spaced away from the circuit patterns provided on or in the first substrate 1.

Third Preferred Embodiment

A third preferred embodiment of the present invention shows an example of a communication device with a structure of a substrate on which a battery and an antenna are mounted, the structure being different from the structure shown in the first preferred embodiment and the second preferred embodiment.

Figure 6:
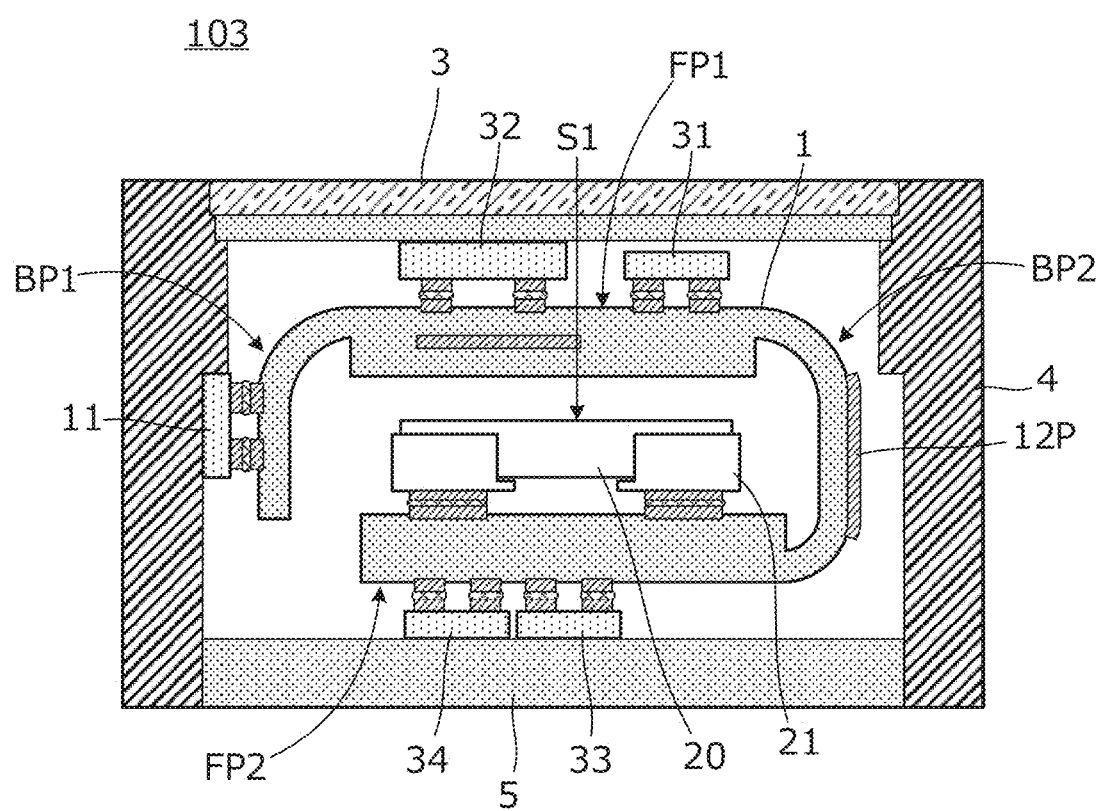
FIG. 6 is a cross-sectional view of a communication device 103 according to a third preferred embodiment of the present invention.

FIG. 6 is a cross-sectional view of a communication device 103 according to the third preferred embodiment of the present invention. The communication device 103 is mainly different from the communication device 101 shown in FIGS. 1A and 1B in the shape of the first substrate 1 and the mounting structure of the first antenna 11 and the second antenna 12.

The communication device 103 includes a first substrate 1, a display panel 3, a back lid 5, and a frame 4 that stores such components. The first antenna 11, and a plurality of other electronic components 31, 32, 33, and 34 are mounted on the first substrate 1. A second antenna 12P defined by a conductor pattern is provided on the first substrate 1. In addition, a battery holder 21 is mounted on the first substrate 1, and a battery 20 is attached to the battery holder 21.

The first substrate 1 includes a first flat portion FP1, a second flat portion FP2, a bent portion BP2 that connects flat portions that are adjacent to each other, and a bent portion BP1 that is continuous from the flat portion FP1. The first antenna 11 is disposed in the bent portion BP1, and the second antenna 12P is provided in the bent portion BP2.

The battery 20, when viewed in the direction perpendicular or substantially perpendicular to a principal surface S1 of the battery 20, is disposed between the first antenna 11 and the second antenna 12P. In addition, the first antenna 11 and the second antenna 12P overlap with the battery 20, when viewed in the direction in parallel or substantially parallel to the principal surface S1 of the battery 20.

FIG. 7A is a cross-sectional view of components of the first substrate 1 before lamination, and FIG. 7B is a cross-sectional view of the first substrate 1 after lamination. The first substrate 1 is a multilayer body of insulator layers 1a, 1b, and 1c, and a conductor pattern is provided at a predetermined place. The insulator layers 1a, 1b, and 1c are, for example, sheets of thermoplastic resin such as liquid crystal polymer (LCP), and the conductor pattern is provided by patterning a copper foil attached to the insulator layers. A second antenna 12P defined by a conductor pattern is provided on the insulator layers 1a. The insulator layers 1a, 1b, and 1c are stacked and thermally pressed to define a multilayer body 1LB shown in FIG. 7B.

FIG. 7C shows a state in which the first antenna 11 and other electronic components 31, 32, 33, and 34 are surface-mounted on the first substrate 1. The first antenna 11 is mounted to the bent portion BP1. In addition, the electronic components 31 and 32 are mounted to the flat portion FP1, and the electronic components 33 and 34 are mounted to the flat portion FP2.

From the state shown in FIG. 7C, each of the bent portions BP1 and BP2 is bent, and the first substrate 1 in the state is incorporated into the frame 4 shown in FIG. 6.

According to the third preferred embodiment, functions and effects similar to the functions and effects according to the second preferred embodiment are able to be achieved. Furthermore, since the two antennas 11 and 12P and the battery 20 are disposed on the first substrate 1 being a single substrate, the number of components is reduced.

Fourth Preferred Embodiment

A fourth preferred embodiment of the present invention shows an example of a communication device including a plurality of batteries.

Figure 8:
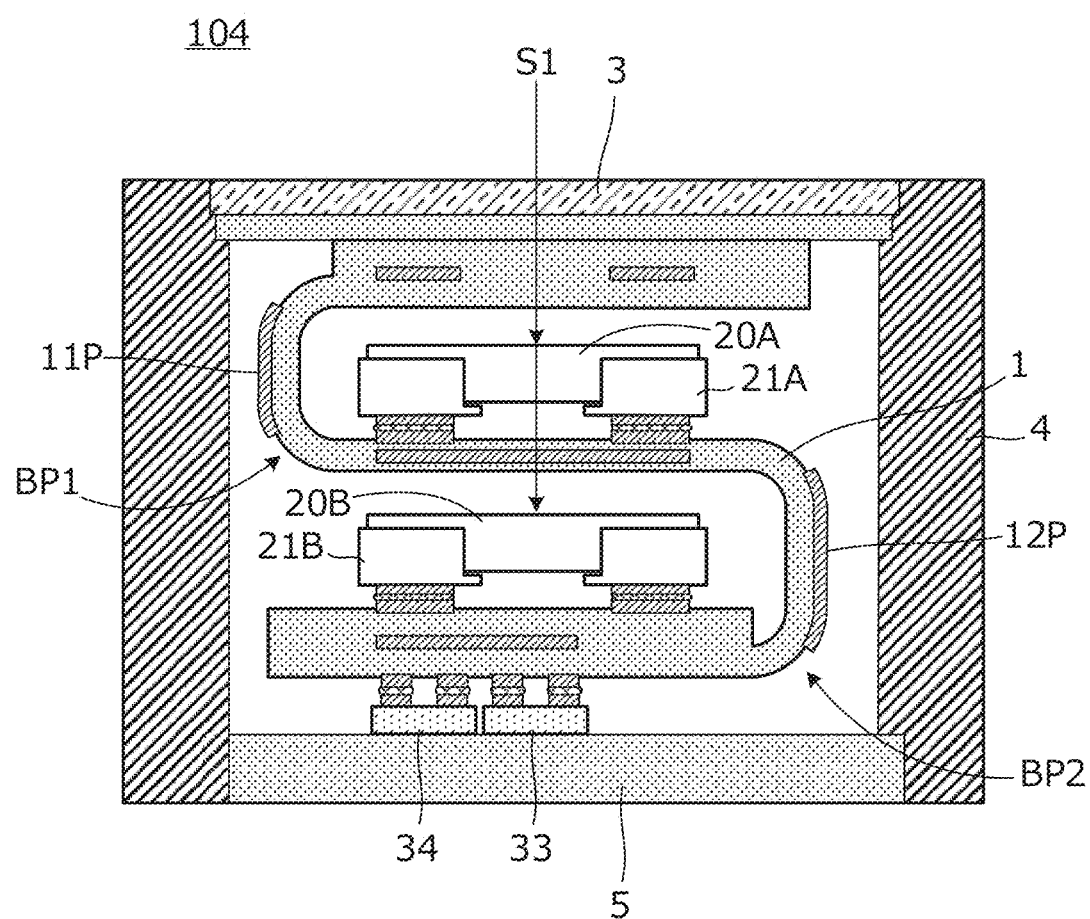
FIG. 8 is a cross-sectional view of a communication device 104 according to a fourth preferred embodiment of the present invention.

FIG. 8 is a cross-sectional view of a communication device 104 according to the fourth preferred embodiment of the present invention. The communication device 104 is mainly different from the communication device 101 shown in FIGS. 1A and 1B in the shape of the first substrate 1, the mounting structure of the first antenna 11 and the second antenna 12, and the arrangement structure of batteries.

Unlike each of the preferred embodiments shown above, two battery holders 21A and 21B are mounted on the first substrate 1, and batteries 20A and 20B are attached to the battery holders 21A and 21B. In addition, a first antenna 11P and a second antenna 12P defined by a conductor pattern are provided on the first substrate 1. The two bent portions BP1 and BP2 of the first substrate 1 are bent in directions opposite to each other. Therefore, a portion of the first substrate 1 is also interposed between the first antenna 11P and the second antenna 12P.

The batteries 20A and 20B, when viewed in the direction perpendicular or substantially perpendicular to the principal surface S1 of the batteries 20A and 20B, is disposed between the first antenna 11P and the second antenna 12P. In addition, the first antenna 11P and the second antenna 12P overlap with the batteries 20A and 20B, when viewed in the direction in parallel or substantially parallel to the principal surface S1 of the batteries 20A and 20B.

According to the fourth preferred embodiment, functions and effects similar to the functions and effects according to the second and third preferred embodiments are able to be achieved. Furthermore, since the two batteries 20A and 20B are provided, a significant shielding effect is obtained. In addition, since the first antenna 11P and the second antenna 12P interpose a portion of the first substrate 1 between the first antenna 11P and the second antenna 12P and are spaced away from each other, the shielding effect of the first antenna 11P and the second antenna 12P is further increased.

In addition, according to the fourth preferred embodiment, since the first antenna 11P and the second antenna 12P that are defined by a conductor pattern are used, even when these antennas are provided in the bent portion, a mounting failure is hard to occur.

Fifth Preferred Embodiment

A fifth preferred embodiment of the present invention shows an example of a communication device including an antenna capable of controlling directivity.

Figure 9:
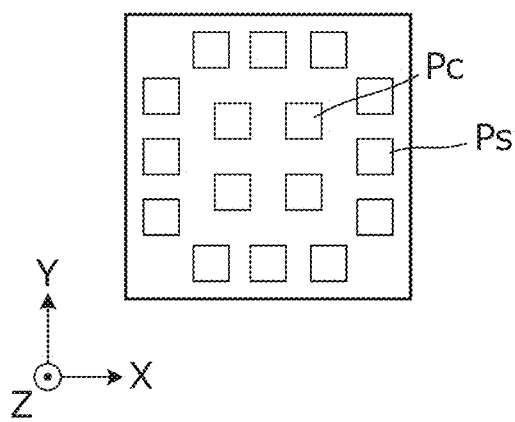
FIG. 9 is a plan view of a first antenna 11 according to a fifth preferred embodiment of the present invention.
Figure 10:
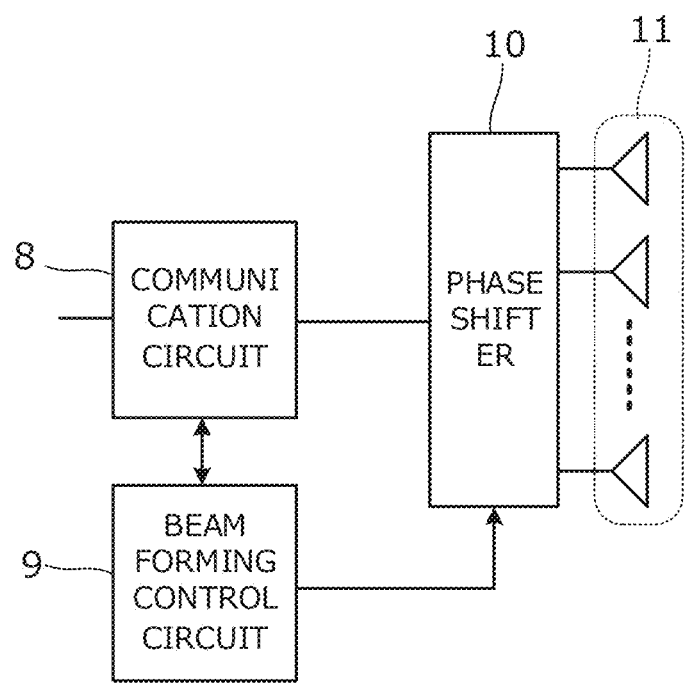
FIG. 10 is a block diagram of a circuit connected to the first antenna 11.

FIG. 9 is a plan view of a first antenna 11. FIG. 10 is a block diagram of a circuit connected to the first antenna 11.

As shown in FIG. 9, the first antenna 11 includes a plurality of patch antennas Pc and Ps. This first antenna 11 is an antenna used for wireless communication standards for short distance high-speed digital wireless transmission such as WiGig (Wireless Gigabit) that uses 60 GHz, for example. As shown in FIG. 10, each of the patch antennas of the first antenna 11 is connected to a phase shifter 10. This phase shifter 10 is controlled by a beam forming control circuit 9. A communication circuit 8 outputs a transmission signal to the first antenna 11 through the phase shifter 10, and receives an input of a reception signal through the phase shifter 10. The beam forming control circuit 9 directs directional beams of the first antenna 11 in a predetermined direction according to the communication state of the communication circuit 8.

The arrangement of the first antenna 11 in relation to other antennas and a battery is as in each of the preferred embodiments that have been described. The first antenna 11 is oriented in a direction away from the battery, for example. As a result, the first antenna 11 may not be easily affected by unnecessary shielding or unnecessary reflection due to the battery. In addition, the interference between the first antenna and the second antenna is able to be further significantly reduced or prevented.

Other Preferred Embodiments

While each of the above described preferred embodiments of the present invention provides an example of the communication device including two antennas, the communication device may include three or more antennas.

In addition, the battery 20 may be directly connected to the circuit board without interposing the battery holder 21.

In addition, while FIG. 1B and FIG. 2 mainly show an example in which, when viewed in the X-axis direction, all of the first antenna 11 and the second antenna 12 overlap with the battery 20 in the width direction and height (thickness) direction of the battery 20. A portion of the first antenna 11 and the second antenna 12 may overlap with the battery 20, when viewed in a direction in parallel or substantially parallel to the principal surface S1 of the battery 20.

In addition, while FIG. 1B mainly shows an example in which the disc-shaped battery 20 is provided, the shape of the battery is not limited to this shape and may be rectangular parallelepiped or the like.

In addition, each of the above described preferred embodiments of the present invention exemplifies a chip antenna or the antenna by a conductor pattern provided on the substrate, the antenna may have another shape or another mounting structure.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A communication device comprising:
 a first substrate including a plurality of antennas including a first antenna and a second antenna; and a battery including a principal surface and being used as a power source of a circuit connected to the plurality of antennas; wherein the battery, when viewed in a direction perpendicular or substantially perpendicular to the principal surface of the battery, is disposed between the first antenna and the second antenna;

a portion or all of the first antenna and the second antenna overlap with the battery, when viewed in a direction in parallel or substantially parallel to the principal surface of the battery;

the first substrate includes a plurality of flat portions including a first flat portion and a second flat portion, and a bent portion that connects flat portions that are adjacent to each other;

the first antenna is disposed in the first flat portion; and
the second antenna is disposed in the second flat portion.

2. The communication device according to claim 1, wherein the first substrate includes a multilayer body of insulator layers; and each of the first flat portion and the second flat portion includes a greater number of insulator layers than the bent portion.

3. The communication device according to claim 1, wherein the first substrate includes the battery or a battery holder that holds the battery.

4. The communication device according to claim 1, further comprising a second substrate that is different from the first substrate, wherein the second substrate includes the battery or a battery holder that holds the battery.

5. The communication device according to claim 1, wherein a use frequency band of the first antenna is substantially an integral multiple of a use frequency band of the second antenna.

6. The communication device according to claim 1, wherein the first antenna and the second antenna are antennas to perform wireless LAN communication using a same or substantially a same frequency band.

7. The communication device according to claim 1, wherein at least one of the first antenna and the second antenna include a directivity that directs a direction away from the battery.

8. A communication device comprising:

a first substrate including a plurality of antennas including a first antenna and a second antenna; and a battery including a principal surface and being used as a power source of a circuit connected to the plurality of antennas; wherein the battery, when viewed in a direction perpendicular or substantially perpendicular to the principal surface of the battery, is disposed between the first antenna and the second antenna;

a portion or all of the first antenna and the second antenna overlap with the battery, when viewed in a direction in parallel or substantially parallel to the principal surface of the battery;

the first substrate includes a flat portion, and a bent portion continuous from the flat portion; and at least one of the first antenna and the second antenna is disposed in the bent portion.

9. The communication device according to claim 8, wherein the first substrate includes a multilayer body of insulator layers; and the flat portion includes a greater number of insulator layers than the bent portion.

10. The communication device according to claim 8, wherein the first substrate includes the battery or a battery holder that holds the battery.

11. The communication device according to claim 8, further comprising a second substrate that is different from the first substrate, wherein the second substrate includes the battery or a battery holder that holds the battery.

12. The communication device according to claim 8, wherein a use frequency band of the first antenna is substantially an integral multiple of a use frequency band of the second antenna.

13. The communication device according to claim 8, wherein the first antenna and the second antenna are antennas to perform wireless LAN communication using a same or substantially a same frequency band.

14. The communication device according to claim 8, wherein at least one both of the first antenna and the second antenna include a directivity that directs a direction away from the battery.

15. A communication device comprising:

a first substrate including a plurality of antennas including a first antenna and a second antenna;

a second substrate that is different from the first substrate; and a battery including a principal surface and being used as a power source of a circuit connected to the plurality of antennas; wherein the battery, when viewed in a direction perpendicular or substantially perpendicular to the principal surface of the battery, is disposed between the first antenna and the second antenna;

a portion or all of the first antenna and the second antenna overlaps with the battery, when viewed in a direction in parallel or substantially parallel to the principal surface of the battery;

the second substrate includes the battery or a battery holder that holds the battery; and a surface of the first substrate on which the first antenna and the second antenna are disposed faces a surface of the second substrate on which the battery or the battery holder is mounted.

16. The communication device according to claim 15, wherein a use frequency band of the first antenna is substantially an integral multiple of a use frequency band of the second antenna.

17. The communication device according to claim 15, wherein the first antenna and the second antenna are antennas to perform wireless LAN communication using a same or substantially a same frequency band.

18. The communication device according to claim 15, wherein at least one of the first antenna and the second antenna include a directivity that directs a direction away from the battery.

* * * * *